INVENTOR
RIENK P. OFFEREINS
BY
AGENT

Fig. 5
Fig. 6
Fig. 7
Fig. 8

INVENTOR
RIENK P. OFFEREINS

United States Patent Office 3,426,340
Patented Feb. 4, 1969

3,426,340
ARRANGEMENT FOR DIGITALIZING POSITIONS
Rienk Pieter Offereins, Hengelo, Overijsel, Netherlands, assignor to N.V. Hollandse Signaalapparaten, Hengelo, Overijsel, Netherlands, a firm of the Netherlands
Filed Dec. 21, 1965, Ser. No. 515,321
Claims priority, application Netherlands, Dec. 23, 1964,
6414971
U.S. Cl. 340—198    6 Claims
Int. Cl. G08c 9/04, 21/00

ABSTRACT OF THE DISCLOSURE

The invention is a system for measuring the rotational displacement of a shaft using a pair of synchronous transformers, a phase detector, and a digital counter triggered by a pulse generator and gated by the phase detector. In order to avoid errors in the count due to variations in the frequency of the pulse generator, the pulses which trigger the counter are converted into a 3-phase reference signal and fed to the polyphase windings of the synchronous transformers.

This invention relates to apparatus for digitally indicating the position of the rotor of a synchronous transformer.

According to the present invention we provide apparatus for digitally indicating the position of the movable part of a synchronous transformer with respect to a reference position. The apparatus includes a source of high and low frequency signals the frequencies having a predetermined ratio one to the other, an electronic counter coupled to the source and having a plurality of positions and operable by the low frequency signal to provide a polyphase output signal, a synchronous transformer having two parts capable of relative motion the one to the other, one part carrying a single phase winding and the other part carrying a polyphase winding energizable by the polyphase output signal, the number of phases of the polyphase winding being equal to the number of phases in the polyphase signal, a filter circuit coupled to the single phase winding for passing a signal of the fundamental frequency of the polyphase signal upon energization of the polyphase winding, a trigger circuit capable of being switched over to a predetermined one of its two states by the signal passed by the filter circuit reaching a predetermined value in a predetermined direction and being switched over to its other state by a reference signal representing a reference position, a digital counter to provide a digital count representative of the position of the movable part relative to the reference position and gating means operable by the trigger circuit to pass the high frequency signal provided by the source to the digital counter upon the trigger circuit being in its one state and to inhibit passage of the high frequency signal upon the trigger circuit being in its other state.

In preferred embodiments of the invention to be described in detail hereinafter the predetermined value to be reached by the signal derived via the filter from the single phase winding of the synchronous transformer to trigger the trigger circuit is zero.

To reduce errors which might occur if the ratio of the frequency supplied to the synchronous transformer to the frequency of the signal supplied to the digital counter varies, a predetermined frequency ratio is established by deriving each of these frequencies from the frequency of one single source of periodically varying voltage. This voltage may have a frequency that is equal to or is higher than the frequency of the pulses or square-wave voltages supplied to the digital counter. The supply voltage of the synchronous transformer is then derived from the frequency of the periodically varying voltage source by frequency division, and this is also the case with the counting frequency if, for some reason, the frequency of the periodically varying voltage source is higher than the counting frequency. In principle it would be possible to start from a periodically varying voltage with a frequency that is at any rate lower than the counting frequency, and to derive the higher frequency by means of frequency multiplication from the frequency of this voltage, but this method is more complicated because it is easier to effect frequency division than frequency multiplication. For this reason, in the most effective forms of apparatus according to the invention, no use is made of frequency multiplication. In both cases, however, the ratio of the frequencies of the counting pulses or square-wave voltages and a single phase alternating voltage for controlling the supply to the synchronous transformers are fixed. The synchronous transformer is fed by a symmetrical polyphase voltage. It is not easy to derive a symmetric polyphase voltage from a single phase voltage without introducing an unacceptable dependance on various values, such as temperature and frequency. This dependence would continuously disturb the symmetry of the polyphase voltage feeding the synchronous transformers, thereby causing measuring errors.

The preferred embodiments of the invention establish a very effective way of obviating these errors by building the apparatus in such a way that the pulses or square-wave voltages driving the digital counter as well as the pulses or square-wave voltages driving the cyclically operating electronic counter are derived with a predetermined fixed frequency ratio from the same periodically changing voltage. In addition, $n$ similarly shaped periodical square-wave voltages, with a mutual phase shift of one $n$th of a cycle, are derived from the output voltages of the trigger circuits of the cyclically operating counter if necessary by combining these output voltages by means of "and" and/or "or" circuits, while $n$ similarly shaped square-wave polyphase voltages, derived from the $n$ square-wave voltages are supplied to the $n$ input circuits of the $n$ phase windings of the synchronous transformer. Moreover, the single phase output voltage of the synchronous transformer or a voltage derived therefrom is supplied to a low pass filter which substantially suppresses all frequencies apart from the fundamental frequency. A bistable trigger circuit, which in one of its states permits the supply of counting pulses or square-wave voltages to the digital counter, is switched over to one of its states by an electrical signal generated at the moment at which the value of the signal passed by said low pass filter or a signal derived therefrom passes a predetermined value in a predetermined direction. The bistable trigger circuit is switched over to its other state by the occurrence of a reference signal.

When the synchronous transformer is fed in the way described above the symmetry of the $n$ phase system feeding this transformer is not lost. The trigger circuits in the counter are always switched over at the moments determined by the occurrence of the periodic voltages controlling the counter, so that the $n$ square-wave voltages supplied to the synchronous transformer will also be independent of extraneous influences and will always occur at moments with an invariable phase shift of $1/n$th of a cycle.

As a rule the supply voltages for the synchronous transformer will be derived by amplification from the $n$ phase square-wave voltages supplied by the trigger circuits in the counter, for in most cases these trigger circuits will not be able to supply sufficiently strong currents for feeding the synchronous transformer.

In one group of embodiments according to the invention the reference signal mentioned is a reference pulse or a reference square-wave voltage that occurs at a fixed moment in the cycle of the synchronous transformer supply voltages, and the moment of occurrence of which is determined by the periodically changing voltage mentioned above and preferably depends on the reference voltage by intermediary of the voltages supplied the the synchronous transformer. If the reference signal is a square-wave voltage, then in certain embodiments this signal is constituted by one of the square-wave voltages supplied to the synchronous transformer. If the reference signal is a pulse this pulse is derived in certain embodiments by differentiation from one of the square-wave voltages supplied to the synchronous transformer. In a very effective embodiment of the invention this reference signal is derived from the output voltage of a second synchronous transformer fed by voltages corresponding to the supply voltages of the synchronous transformer already mentioned. In this embodiment the polyphase windings of these transformers may be connected in parallel. The embodiment just described can also be used when the reference signal does not have a fixed position in the cycle of operation of the system and the rotors of both transformers move, in accordance with the changes of different values, for instance. The difference between these values is then digitalized.

Preferably the frequency of the periodically varying voltage from which the pulses or square-wave voltages as well as the square-wave voltages supplied to the synchronous transformer are derived is at least as high as the frequency of the pulses or square-wave voltages supplied to the digital counter. Should the frequency of the periodically varying voltage for some reason be higher than the frequency of the pulses or square-wave voltages supplied to the digital counter, then the first mentioned frequency must be a multiple of the last mentioned one. The counting pulses of square-wave voltages are then derived by frequency division from the periodically varying voltage.

A simple embodiment of an arrangement according to the invention is obtained if the number of positions of the cyclically operating electronic counter that controls the generation of the polyphase synchronous transformer supply voltages is equal to the number of phases of the synchronous transformer.

In considering the operation of an arrangement according to the invention it is important to note that the output voltage of a synchronous transformer fed in the way described by a polyphase square-wave voltage is, as will be elucidated below, not suitable for the purpose of indicating the positions of the movable part e.g. the rotor of the synchronous transformer. It will be shown that the moments at which this output voltage passes the zero value change abruptly in steps when the position of the rotor is changed continually, although the shape of the voltage curve changes continuously in accordance with this position. Surprisingly, the moments at which the component with the fundamental frequency derived by the low pass filter from the output voltage of the synchronous transformer passes the zero value, not only change continuously in accordance with the position of the rotor, but are moreover an effective indication of this position.

It is to be noted that if in this specification it is stated that a varying voltage, for instance a voltage derived from the output voltage of a synchronous transformer, passes zero value, this passage need not take place with respect to the potential zero but may very well be measured with respect to a bias voltage which is not zero and which may either apply a predetermined level to the part of the circuit to which said varying voltage is applied or may change the level of the voltage with which the varying voltage is compared. In this respect "zero value" should be interpreted as "quiescent value." This needs no elucidation.

Good results are obtained when a ring-counter is used for the purpose of generating the polyphase square-wave voltages but in various cases good results may be obtained by means of other electronic counters.

In connection with the terminology used the following is to be noted: In the technique of the data handling systems circuits reacting to pulses and circuits reacting to square-wave voltages can be applied. A pulse is in this respect a temporary electrical change, the duration of which, apart from the fact that it must have a certain minimum value, is of no importance, and is, as a rule, small with respect to the cycle in which the pulse occurs. Square-wave voltages, on the contrary, are temporary voltage changes which are maintained during a well-defined interval that, as a rule, is not small with respect to the cycle in which the square-wave occurs, and in many cases has a fixed ratio with respect to the duration of this cycle. A circuit reacting to square-waves reacts to the presence or absence of voltages.

In order that the present invention may be more clearly understood and readily carried into effect, reference may now be had to the accompanying drawings illustrating preferred embodiments in which.

Figure 1:
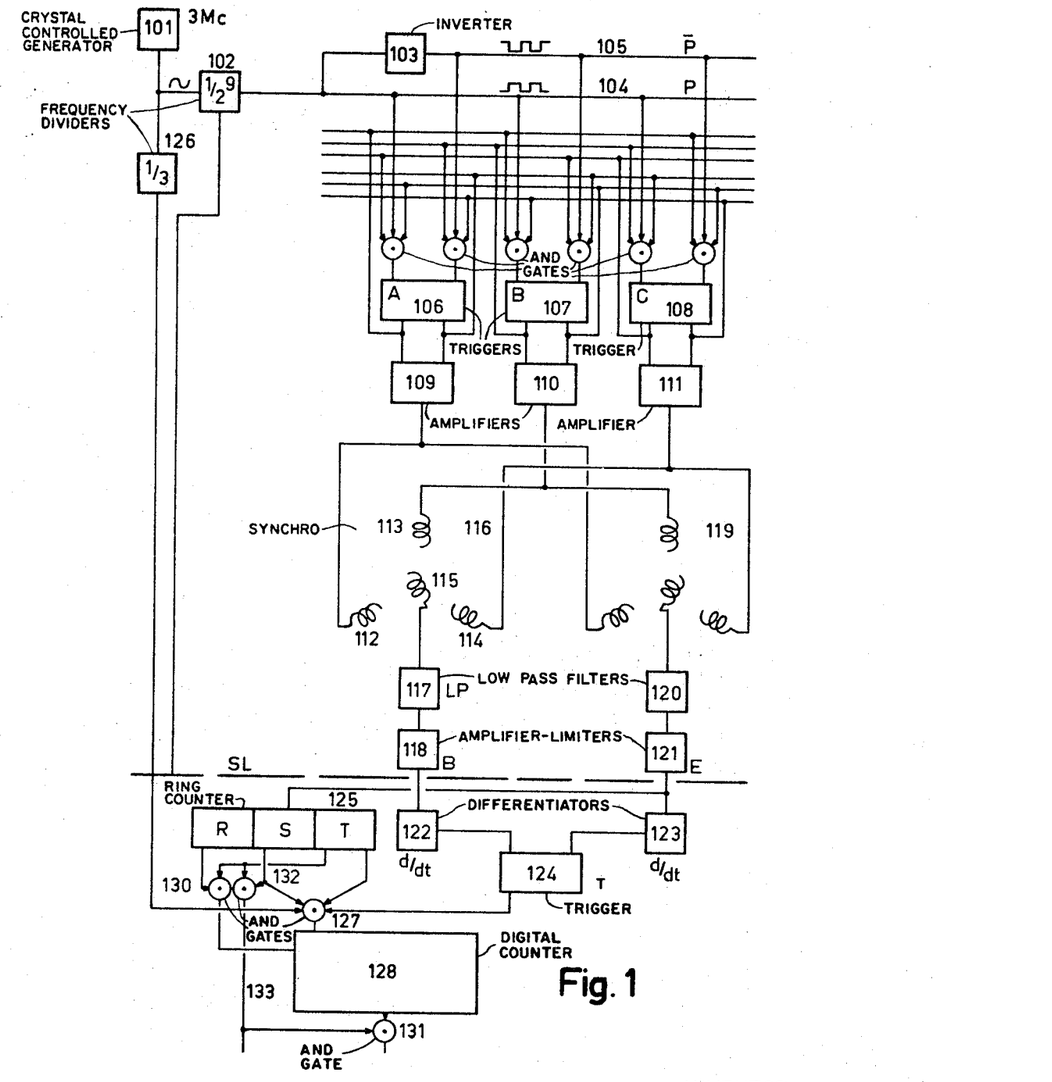
FIG. 1 is a circuit of a first embodiment of apparatus according to the invention.
Figure 2:
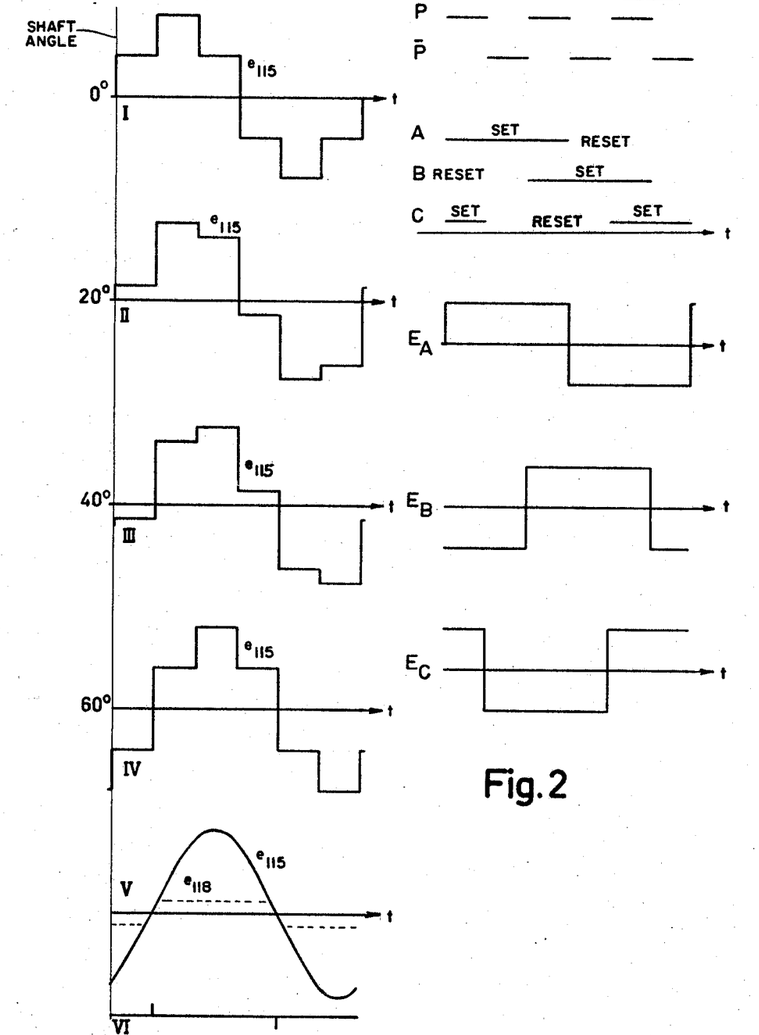
FIG. 2 shows a number of diagrams relating to the operation of the apparatus shown in FIG. 1.

In the embodiment shown in FIG. 1 all square-wave and pulse voltages are derived from an alternating voltage with a frequency of 3 mc., supplied by a crystal controlled generator 101. This voltage is supplied to a frequency divider 102, which divides the frequency by $2^9$. The output voltage of this frequency divider has a frequency of about 5.9 kc./s. (accurately 5859 c.p.s.). The frequency divider operates with trigger circuits and consequently supplies no sine-shaped voltages but square-wave voltages, including the square-wave voltage P with the above mentioned frequency of about 5.9 kc./s. and a shape shown near the output circuit 104 of the frequency divider. This square-wave voltage is inverted in an inversion circuit 103, so that an inverted square-wave voltage $\bar{P}$ is applied to the circuit 105. These two square-wave voltages, which are also shown in FIG. 2 in the diagrams P and $\bar{P}$, together control in a well-known way a ring counter with three positions of the usual type that therefore need only be described superficially. This ring counter comprises three trigger circuits 106, 107 and 108 or A, B and C. Each of these trigger circuits can be set by way of an "and" circuit by a square-wave voltage P and be reset by way of an "and" circuit by an inverted square-wave voltage $\bar{P}$. Whether such a square-wave voltage actually sets or resets the trigger circuit depends on the state of the other trigger circuits in the counter. A predetermined trigger circuit, for instance the trigger circuit B, can only be set if the trigger circuit A, which in cyclic order precedes the trigger circuit B, is set, and the trigger circuit C, which in cyclic order follows the trigger circuit B, is reset. The resetting of a trigger circuit is only possible if the trigegr circuit following it in cyclic order is set, and the trigger circuit which in cyclic order precedes it is reset. Consequently if a predetermined trigger circuit, for instance the trigger circuit B is set by a square-wave P the next inverted square-wave P̄ resets the trigger circuit A preceding said trigger circuit B, because now the trigger circuit B is set and the trigger circuit C is reset. The next square-wave voltage P sets the trigger circuit C (108), because now the preceding trigger circuit B is set while the trigger circuit A has in the meantime been reset. Careful consideration of the circuit of the counter shows that the various trigger circuits in the counter are set and reset with a frequency that is equal to one third of the frequency of the square-wave voltages P, and that their setting and resetting occurs according to the lines A, B and C in the diagram of FIG. 2. The output voltages of these trigger circuits are used to control the generation of the voltages applied to the input circuits of the three-phase windings of one or more three-phase synchronous transformers. The trigger circuits themselves are unable to produce a sufficiently strong current for feeding these windings, and for this reason the trigger output voltages are amplified by means of three amplifiers 109, 110 and 111. The output voltages of these three amplifiers are the input voltages of the three-phase synchronous transformers. In FIG. 1 two such synchronous transformers 116 and 119, are shown. In the transformator 116 the three-phase stator windings are indicated by 112, 113 and 114, while the rotor winding has the reference 115. A fixedly adjusted synchronous transformer 119 supplies the fixed reference phenomenon and the synchronous transformer 116 supplies the phenomenon to be measured. The synchronous transformer 116 is therefore adjusted in accordance with this measuring value. The amplifier 109 supplies a square-wave voltage that in FIG. 2 is represented by the curve $E_A$ to the winding 112. In the same way the amplifiers 110 and 111 supply square-wave voltages which can be represented by the curves $E_B$ and $E_C$ to the windings 113 and 114. In the secondary rotor winding 115 voltages are induced that are a superposition of the influences of the voltages supplied to the three stator windings. In establishing the total influence of the primary windings on this secondary rotor winding it should be taken into account that the influence of a certain stator winding on the rotor winding is proportional to the cosine of the angle between the axes of the windings. In order to give an impression of the shape of the voltage curve induced in the rotor winding, FIG. 2 shows four curves corresponding to four different angles between the axis of the rotor winding 115 and the axis of the winding 112. A voltage $e_{115}$ corresponding to the curve I is induced when the axes have the same direction; the curves II, III, IV show these secondary voltage curves when the axes enclose angles of 20°, 40° or 60°. After a rotation of 60° the shape of the curve is the same as that for the position of rest at zero degrees with this distinction however, that the curve has been shifted ⅙ of a full cycle. Considering similar curves relating to 18 different positions. that, starting from the position of rest, are 20° apart it becomes apparent that the same set of curves is repeated 6 times, each curve separated from the corresponding shape previous one by ⅙ of a cycle. It is obvious that the curves shown in FIG. 1 are ideal curves, but if suitable measures are taken to reduce the influences of undesired capacities, inductions and couplings these ideal curves can be substantially approximated.

The moment at which the rotor voltage passes zero value in a predetermined direction is to be used as a measure for the position of the rotor. Two methods can be applied for this purpose. The first method operates with circuits that react to the presence or absence of voltages, and in circuits operating in this way it is established that the output voltage of the rotor deviates in a predetermined direction from zero value in order to establish that said output voltage has passed zero value in that direction. The other method operates with a circuit reacting to pulses, and in this circuit the output voltage of the rotor is limited and differentiated. The differentiator used for this purpose will at any rate supply a pulse when the said output voltage passes zero value, and the polarity of this pulse corresponds to the direction in which this passage takes place. The voltage curve described above is, however, absolutely unsuitable for both methods. The output voltage only changes at moments which are situated ⅙ of a cycle apart. In the curve I the passage of zero occurs at the beginning and in the middle of a cycle. This is still the case after the rotor has been rotated 20°, as may be derived from the curve II. After an angle the value of which is between 20° and 40° and which actually is 30° has been covered the moment at which the output voltage passes zero suddenly jumps, after which these passages through zero occur at ⅙ and ⅔ of a cycle after the moment corresponding to the beginning of the curves I–IV. This is still the case after the rotor has covered an angle of 60° from the position for which the curve I is valid and remains unchanged, as may be derived by drawing other curves for other positions, until the rotor winding has been rotated 90° from the position corresponding to the curve I. It is obvious that in this way no continuous indication of the position of the rotor can be obtained. No better results can be obtained when the passage through zero is established by limiting and differentiation; on the contrary, more complications are to be expected. The differentiator will at any rate supply pulses at the moments corresponding to the passages through zero that can also be established by the method described above but under certain circumstances it will supply additional pulses. The output voltage curve consists of various parts in which the output voltage has various constant values. When the curves I, II, III are compared it will be clear that the voltage corresponding to the first sixth part of a cycle becomes lower when the rotor is rotated. After a certain amount of rotation this voltage will be lower than the value at which the limiter limits this voltage. Thereafter the differentiator can react successively to two voltage variations. The first occurs when the voltage corresponding to the first sixth part of the curve is reached and the second when this voltage changes to a higher value. In both cases the pulse generated by the differentiator has the same polarity. Consequently from time to time more than one value for the position of the rotor is obtained, and these values will vary abruptly. In order to avoid such complications, according to the invention the output voltage of the rotor winding 115 is supplied to a low-pass filter 117 which suppresses all frequencies, apart from the fundamental frequency. A fairly simple filter, which consists primarily of resistors and condensors, can be used for this purpose, for as a result of the symmetry of the voltage curves all even harmonics and all harmonics, the number of which is a multiple of three, are absent. Consequently the lowest harmonic frequency which must be suppressed by the filter is the fifth. The sine-shaped output voltage of the filter actually shifts continuously in accordance with the position of the rotor. The moment at which a voltage with a predetermined sign appears at the output circuit of this filter can be used as a measure for the position of the rotor. The same is valid for the pulses that can be derived by limiting and differentiation from said sine-shaped output voltage of the filter. In FIG. 2 a curve V is present, which shows the sine-shaped output voltage $e_{117}$ that the filter derives from the discontinuous curve IV. In FIG. 1 part 118 is a limiter which limits the output voltage of the low-pass filter 117. The shape of the output voltage $e_{117}$ of this limiter is shown in curve V by a dotted line. In circuits reacting to the presence of voltages, that is to square-wave voltages, the moment of occurrence of the passage through zero of the limited voltages is used as a measure for the position of the rotor. In systems reacting to pulses the limited voltage is differentiated in a differentiating circuit 122 that supplies a pulse at the moment said limited voltage passes zero.

The moment of occurrence of this pulse is a measure for the position of the rotor 115. The diagram VI in FIG. 2 shows these pulses. It should be noted that both in systems reacting to pulses and in systems reacting to square-waves, that is to the presence or absence of voltages, an accurate determination of the moment at which said voltage passes the zero value is only possible if the voltage curve near the zero passage is steep. In order to increase this steepness the output voltage of the low-pass filter is amplified. The maximum value of the output voltage of this amplifier is, as a rule, considerably too high for the circuits which are to be controlled by it. For this reason limiting of this voltage takes place. In the figures it is assumed that the amplifier and the limiter are combined to a unit (118, 121). The sine-shaped curve V (FIG. 2) in this case represents the amplified output voltage of the low-pass filter.

In order to digitalize the position of the rotor the counter 128 is caused to count pulses or square-wave voltages with a fixed frequency during the interval between the said zero passage of the output voltage of the filter or the small pulse which represents this passage on the one hand, and an electrical change occurring a fixed moment in the cycle of the synchronous transformer 116 such as, for instance, the passage through zero of another voltage or the appearance of another pulse on the other hand. The operation of the counter may be started by the phenomenon representing the position of the movable rotor and be stopped as a result of the occurrence of the fixed reference phenomenon. The counter may also be started by the fixed reference phenomenon and be stopped by the occurrence of the phenomenon that represents the position of the movable rotor. The angular position of the rotor is then measured from a fixed reference point in either direction. The reference phenomenon may be any pulse or any square-wave voltage with a fixed position in the cycle of the counter A, B, C. The output voltage of the trigger circuit A might be applied for this purpose, for instance. In many cases, however, it is desirable for the moment of occurrence of the reference phenomenon to be adjustable in the cycle. Furthermore it is desirable for the reference phenomenon to be derived from the voltage of the generator 101 in the same way as the phenomenon that represents the position of the rotor 115. This has the advantage that the moment of occurrence of the electrical change which represents the position of the rotor as well as the moment of occurrence of the electrical change which represents the reference moment depend at least approximately, in the same way on secondary phenomena, such as temperature, and frequency. For these reasons the reference phenomenon is preferably generated by means of a second synchronous transformer. In FIG. 1 such a second synchronous transformer 119 is shown. The rotor output voltage of this synchronous transformer is supplied to the low pass filter 120. The output voltage of this low pass filter is amplified in a way similar to that of the output voltage of the filter 117 and limited by limiter 121. If the system is a system reacting to pulses, the square-wave voltage supplied by the limiter 121 is differentiated in a differentiator 123. This differentiator supplies two pulses with opposite polarity per cycle, one of which, defined by its polarity, is a measure for the reference moment. By changing the position of the rotor of the synchronous transformer 119 the moment of occurrence of the reference phenomenon can be set accurately.

The part of the system described above, can, apart from the differentiators 122 and 123 be applied in arrangements reacting to square-wave voltages as well as in an arrangement reacting to voltage pulses. As has been remarked above, the limiter (118, 121) cannot, as a rule, be dispensed with in systems reacting to square-wave voltages, because these square-wave voltages must be applied in order to obtain steep edges, and the maximum values of these amplified voltages are too high for various circuit components.

Systems reacting to pulses are less complicated than systems reacting to square-wave voltages, and for this reason the circuit present under the dotted line SL in FIG. 1, which reacts to pulses, will be described first. In this system the differentiators 122 and 123 are present. The pulse representing the position to be established digitally and which is derived by the differentiator 122 from the voltage supplied by the rotor 115, sets, if it has a predetermined polarity, the trigger circuit 124 after which this trigger circuit is reset by the reference pulse produced by the differentiator 123. As long as the trigger circuit 124 is in its set condition it permits the "and" circuit 127 to let the counting pulses pass to the counter 128. This counter then counts the pulses occurring in the time interval between the pulse which represents the position of the rotor 115 and the reference pulse. In the embodiment described these counting pulses are derived, by means of a frequency divider 126 dividing by three, from the voltage of the generator 101. This source was used because the generator frequency, which was determined in connection with the available generators was higher than was required in connection with the accuracy of the arrangement and the recurrence frequency of the measurement; it was, moreover, higher than the highest frequency by which the counter could be controlled. The frequency divider is, however, by no means essential, in contradistinction to the frequency divider 102 which effects the division by $2^9$. This division is absolutely necessary because each full cycle of the voltages supplied to the synchronous transformer must correspond to a fairly large number of counting pulses or counting square-wave voltages. The ratio of the frequency of the counting pulses or counting square-wave voltages to the frequency of the voltages supplied to the synchronous transformer determines the accuracy. In the arrangement described, about 500 counting pulses or counting square-wave voltages are supplied to the "and" circuit 127 during a complete cycle of the field in the synchronous transformer 116. This means that the accuracy cannot be greater than $\frac{1}{500}$ of a complete revolution. This ratio is not arbitrary. Very accurate synchronous transformers have been built for measuring purposes but their accuracy is limited because the rotational speed of the field generated by the polyphase currents is not absolutely constant. Moreover the amplitude of this field varies slightly during the rotation, both as a result of the unavoidable inequalities in the distribution of the windings and in the reluctance of the cores. There is no point in using a counter having an accuracy greater than the maximum accuracy that can be obtained by the synchronous transformer. If a greater accuracy is desired then an arrangement with a coarse- and a fine-system will have to be used. If in an arrangement according to the invention a coarse- and a fine system are used then the synchronous transformers of both systems are preferably fed by the same amplifiers 109, 110 and 111, or at any rate the supply voltages for these transformers are controlled by the same counter. Moreover, preferably the same reference pulse is applied in the coarse- as well as in the fine system. Depending on the character of the computer or the data handling system to which the measuring results are to be transmitted, either separate counters and counter controlling trigger circuits are applied in the fine- and in the coarse system, or the fine- and the coarse systems use the same counter and counter controlling trigger circuit successively.

Figure 4:
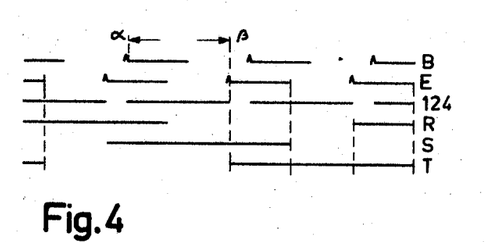
FIG. 4 is a diagram of the operation of the arrangement shown in FIG. 1.

Before the counter 128 can count the number of pulses occurring during a measuring interval the result present in the counter should be transmitted to the data handling system and the counter must be reset. In connection therewith, in the circuit arrangement shown, the supply of the counting square-wave voltages by way of the "and" circuit 127 also depends on the position of a three stage control counter 125. In the embodiment described this control counter is built in the same way as the counter with the trigger circuits A, B and C and is driven by the square-wave voltages derived by the filter 120 and the limiter 121 from the output voltage of the reference synchronous transformer 119. The latter square-wave voltages will hereinafter be referred to as the "end" square-waves E. The counter 125 is controlled by these end square-waves E in a way similar to that in which the counter A, B, C is controlled by the pulses P. A diagram of the operation of the control counter is shown in FIG. 4. This figure shows the square-wave voltages, hereinafter referred to as "begin" square-waves B, which are derived by the low pass filter 117 and the limiter 118 from the output voltage of the measuring synchronous transformer 116, as well as the end square-wave voltages E originating from the reference synchronous transformer 119. In order to determine the angle, the duration of the interval $\alpha-\beta$ between the beginning of the begin square-wave and the beginning of the next end square-wave is established by counting square-wave voltages produced by the frequency divider 126 during said interval. The end square-wave voltages control the three trigger circuits R, S and T in the control counter 125. The conditions of these trigger circuits are represented by the lines R, S and T in FIG. 4. In the arrangement described the supply of pulses to the counter is only possible if the trigger circuit S is in the set state and the trigger circuit T is in the reset state simultaneously, for which purpose two input circuits of the "and" circuit 127 are connected to suitable output circuits of the trigger circuits S and T. Whatever the duration of the interval $\alpha-\beta$ may be a complete interval $\alpha-\beta$ will always be situated within the limits of the interval during which, simultaneously, the trigger circuit T is in its reset state and the trigger circuit S in its set state. Immediately after this interval, determined by the trigger circuits T and S, the setting of the counter may be transmitted. In the arrangement described this transmission depends on the fact that the trigger circuits S and T are simultaneously in the set state, for which purpose output circuits of these trigger circuits supply predetermined voltages to input circuits of an "and" circuit 132, which then supplies a voltage that constitutes an order for transmission to the circuit 133. It is presumed that this order is transmitted to a data handling system. Moreover this order is supplied to a group of "and" circuits 131 which then connect the output circuits of the trigger circuits in the counter with the said data handling machine. Before the next measuring operation is started the counter must be reset to zero. This resetting operation takes place in the arrangement described when the trigger circuits R and T are simultaneously in their set states. Output circuits of these trigger circuits supply, in the set conditions of these trigger circuits, predetermined potentials by way of an "and" circuit 130 to an input circuit of the counter by way of which this counter can be reset. The system operates as follows: When the trigger circuit 124 is set by a pulse derived by the differentiating circuit 122 from a begin square-wave voltage B, and moreover in the control counter 125 the trigger circuit T is reset and the trigger circuit S is set, the "and" circuit 127 permits the counting pulses or counting square-waves supplied by the frequency divider 126 to reach the counter, which consequently counts these pulses. The pulse which the differentiator 123 derives from the beginning of the end square-wave voltage E, resets the trigger circuit 124 so that the "and" circuit 127 becomes nonconductive for the counting pulses. The counting operation is only effected once during three successive cycles of the counter A, B, C, because only once in these three cycles are the trigger circuits set and the trigger circuit T reset. The next two cycles are used for the transmission of the setting of the counter and for the resetting of the counter.

Figure 3:
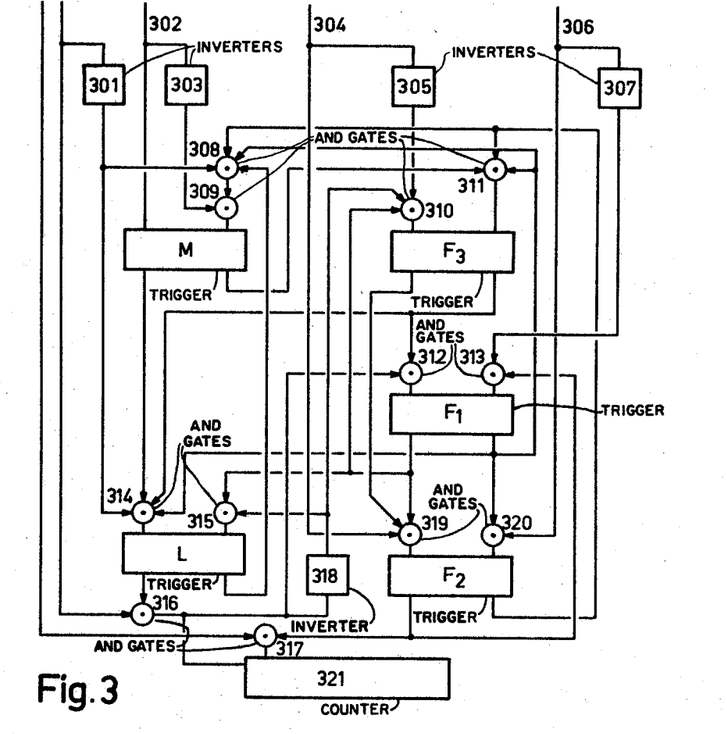
FIG. 3 shows, together with the upper part of FIG. 1, a circuit of a second embodiment of apparatus according to the invention.

The digitalizing method described with reference to FIG. 1 has the disadvantage that trigger circuits which are essential in controlling the digitalizing operation, such as the trigger circuit 124 react to pulses instead of to voltages. There are specialists in the electronic field who consider this method less reliable. These specialists prefer circuit arrangements in which, among other things, the switching over of the trigger circuit which controls the supply of counting pulses or counting square-waves to the counter is itself controlled by square-waves instead of by short pulses. This results however in certain complications, because trigger circuits reacting to voltages must be prevented from reacting to voltages that are already present at the moment at which the trigger circuit obtains the opportunity to react. A circuit arrangement in which the trigger circuits need not react to short pulses is obtained when the circuit of FIG. 3 is combined with the part of FIG. 1 situated above the dotted line SL. In elucidating the circuit arrangement thus obtained, the description of the parts shown in FIG. 1 need not be repeated, for it has already been described how the limiters 118 and 121 supply square-wave voltages the moments of occurrence of which are determined by the positions of the rotors of the synchronous transformers 116 and 119. Comprehension of the operation of the circuit shown in FIG. 3 can be facilitated by consulting the diagram shown in FIG. 5 in which the time relation of the various square-waves and the states of the trigger circuits in the circuit arrangement according to FIG. 3 is shown. In this circuit arrangement the counter is reset and various trigger circuits in the control arrangement shown in FIG. 3 are switched over by square-wave voltages supplied by at least one of the trigger circuits in the frequency divider 102 operating as a counter. These square-wave voltages are represented in the diagram by the dotted line S. For the sake of lucidity the square-wave voltages are shown on a scale that is considerably larger than the scale on which other phenomena are shown in the same diagram. When reading has to be effected, a measuring order voltage is applied to the conductor 302. In the diagram this voltage is represented by the line MO. This voltage sets the trigger circuit M. The set state thus obtained is represented in the diagram by the line M. An inverter 301 inverts the control square-wave voltages S, and in this way supplies the inverted square-wave control voltages $\bar{S}$. The first inverted square-wave control voltage $\bar{S}$ supplied after the setting of the trigger circuit M sets the trigger circuit L, provided that the trigger circuits $F_3$ and $F_1$ are reset and apply such voltages to the two right hand input circuits of the "and" circuit 314 that this "and" circuit can be made conductive for the inverted control square-wave voltages by the trigger circuit M in its set condition. The reset condition of the trigger circuits $F_1$ and $F_3$ corresponds to the condition of rest of the circuit arrangement shown in FIG. 3. The next square-wave control voltage can now pass the "and" circuit 316 in order to reach the left hand input circuit of the counter 321, causing this counter to be reset. Moreover, this zero setting square-wave control voltage sets the trigger circuit $F_1$ in a circuit passing through the "and" circuit 312. This is possible because the trigger circuit $F_3$ in its reset condition applies such a voltage to the upper input circuit of this "and" circuit 312 that this "and" circuit is able to let said zero setting square-wave voltage pass to the trigger circuit $F_1$. As soon as the trigger circuit $F_1$ is set and the zero setting square-wave voltage has come to an end, the inverted zero setting voltage supplied by the inverter 318 will pass the "and" circuit 315, now made conductive by the trigger circuit $F_1$ in its set condition. This causes the trigger circuit L to be reset. Now the trigger circuit $F_3$ will be set, but only if three conditions are satisfied. In the first place the zero setting must have been started, which may be derived from the fact that the zero setting square-wave voltage has been able to set the trigger circuit $F_1$ which then applies a predetermined voltage to the left hand input circuit of "and" circuit 310. Furthermore the resetting of the counter must have been completed so that the zero setting square-wave voltage has come to an end. This is established by establishing the fact that the inverter 318 applies a predetermined voltage to the center input circuit of the "and" circuit 310. Finally, in the time sequence, the circuit arrangement must be between two begin square-wave voltages B supplied by the limiter 118 to the conductor 304. This is derived from the fact that the inverter 305 supplies a predetermined voltage to the upper input circuit of the "and" circuit 310. Because of the voltages supplied in the way described above to the other input circuits of the "and" circuit 310, this "and" circuit permits the predetermined voltage supplied by the inverter 305 to reach the left input circuit of the trigger circuit $F_3$ and set this trigger. In this way the counting operation is prevented from being started by a begin square-wave voltage B, which, although present at the moment at which the measuring order is given, has begun a short time before. The trigger circuit $F_2$ that starts the counting by being set cannot be set before the triggers $F_3$ and $F_1$ have been set and apply suitable voltages to the middle and upper circuits of the "and" circuit 319.

As soon as the current interval between two begin square-wave voltages has come to an end, the voltage applied to the conductor 304 as the result of the occurrence of the next begin square wave voltage will reach the left hand input circuit of the trigger circuit $F_2$ by way of the "and" circuit 319 and will set this trigger circuit, because the other two input circuits of said "and" circuit at this moment receive such voltages from the trigger circuits $F_1$ and $F_3$ that said "and" circuit 319 will be able to allow the begin square-wave voltage to pass. This setting of the trigger circuit $F_2$ makes the "and" circuit 317 conductive as a result of which the counter 321, which has already been reset, will now receive counting square-wave voltages with a frequency of 1 mc. supplied by the frequency divider 126 and start counting. The counting operation should be ended and the trigger circuit $F_2$ reset as soon as the beginning of the next end square-wave voltage E, which has not begun before the begin square-wave voltage which started the counting operation is received. It is very well possible that, at the moment at which the begin square-wave voltage sets the trigger circuit $F_2$ and in this way starts the counting, an end square-wave voltage that was already present at that moment will not yet have come to an end. This would result in the trigger circuit $F_2$ being reset immediately. The trigger circuit $F_1$ prevents such an immediate reset because this trigger circuit in its set condition applies such a voltage to the upper input circuit of the "and" circuit 320 that this "and" circuit will not allow the end square-wave voltage applied to the circuit 306 to pass.

The trigger circuit $F_1$ can be reset by way of the "and" circuit 313 by the inverted end square-wave voltage that is produced in the inverter 307, provided that the trigger circuit $F_2$ is set. Consequently this trigger circuit will not be reset before any end square-wave voltage that might be present at the moment of commencement of the begin square-wave voltage that started a counting operation has come to an end. Then and only then can this trigger circuit $F_2$ be reset by the next end square-wave voltage flowing through the "and" circuit 320, which is made conductive for this voltage by the trigger circuit $F_1$ in its reset condition. As soon as the trigger circuit $F_2$ has returned to its reset condition, the supply of counting square-wave voltages to the counter 321 is interrupted. The duration of the interval between the starting moments of the begin and the end square-wave voltages has now been determined. Next the control circuit shown in FIG. 3 must return to its condition of rest. For the time being no description is given of the reading of the counter. At the moment at which the counting operation is completed the trigger circuits $F_1$, $F_2$ and L are in the reset condition. Consequently the three right hand input circuits of the "and" circuit 308 receive such voltages that this "and" circuit will permit the next inverted control square voltage $\overline{S}$ supplied by the inverter 301 to pass. This inverted control square-wave voltage reaches an input circuit of the "and" circuit 309 in order to reset the trigger circuit M, but as long as the measuring order voltage is present at the circuit 302 the inverter 303 applies such a voltage to the second input circuit of this "and" circuit, that nothing can happen. As soon, however, as this order voltage has come to an end the next inverted control square wave voltage will reach the right hand input circuit of the trigger circuit M and reset this trigger circuit. The voltages now applied by the trigger circuits $F_1$, $F_2$ and M to the three input circuits of the "and" circuit 311 will then reset the trigger circuit $F_3$. The complete control circuit arrangement shown FIG. 3 has now returned to its condition of rest.

As a rule it is necessary for the value registered in the counter to be transmitted, for instance to a computer. Then the counter must be prevented from being reset before this transmission has taken place. For this purpose the connection between the "and" circuits 309 and 308 is broken. The output circuit of the "and" circuit 308 is connected to the data handling arrangement, such as a computer, which is to receive the measured value, and the voltage applied to this output circuit after the counting operation has come to an end communicates to this arrangement that the transmission of a measuring result can be started. The data handling system then causes this transmission to take place, for instance by connecting the output circuits of the trigger circuits in the counter by way of "and" circuits to the circuits in the data handling arrangement which are to receive the reading of the counter. As soon as this transmission has taken place the data handling arrangement applies a suitable voltage to the upper input circuit of the "and" circuit 309, which in this case is not connected to the output circuit of the "and" circuit 308. This voltage causes the trigger circuit M to be reset, provided that the measuring order voltage is no longer present in the circuit 302.

The arrangement described with reference to the FIG. 1 and FIG. 3 start the counting operation when it receives the beginning of the square-wave voltage supplied by the components connected to the synchronous transformers with a variable position, and cause the counting operation to end when the beginning of the square-wave voltage derived from the output voltage of the synchronous transformer with a fixed adjustment which supplies the reference moment is received. It is obvious, however, that the tasks of these two square-wave voltages can be exchanged without further changes in the circuit arrangement.

One single circuit arrangement as described above can be used for digitalizing the positions of a number of objects. For this purpose the circuit arrangement controlling the counter is successively connected by a distributor switch to the output circuits of various synchronous transformers for different movable objects. In order to reduce the effect of transients resulting from the switching operations effected by the distributor in the connection to the synchronous transformers it is desirable for each synchronous transformer to be permanently connected to its own low pass filter and limiter, the selection by the distributor switch being effected between the output circuits of the limiters and the counting arrangements, although this is not absolutely necessary. As a rule, the reference square-wave voltage or pulse used for the various digitalizing operations to be effected by the same counting arrangement is the same wave or pulse supplied by one single synchronous transformer or other circuit arrangement, which is common to all objects the positions of which are to be digitalized. The distributor switch which effects the selection will then only switch over the connection to the synchronous transformers which are set in accordance with the values to be digitalized.

In measuring arrangements provided with synchronous transformers coarse and fine systems are applied in many cases. The circuit arrangement according to the invention can also cooperate with such a coarse and fine system. Regarded from this circuit arrangement the synchronous transformers in the coarse and in the fine system are completely separate data sources, and it would be possible to digitalize the values supplied by these sources successively by means of the same arrangement cooperating with a distributor switch. In many cases, however, such successive digitalization of values supplied by coarse and fine systems is considered to be undesirable and then it is preferable to effect the digitalization of the coarse and fine value simultaneously. In principle this may be effected by two separate circuit arrangements according to FIG. 3 or according to the lower half of FIG. 1. It appears, however, that a complete duplication of the circuit arrangement is not necessary, and that the coarse- and fine digitalization circuits may have parts in common. The part of the circuit according to FIG. 3 which comprises the trigger circuits M and L, the inverters 301, 303 and 318 and the "and" circuits 308 and 316, for instance, need not be duplicated, provided that the "and" circuit for controlling the trigger circuits M and L with input circuits that receive output voltages of one or more of the trigger circuits $F_1$, $F_2$ and $F_3$ are now also provided with input circuits connected to output circuits of the second set of trigger circuits $F_1$, $F_2$, $F_3$. If the number of input circuits of such an "and" circuit would in this way become too large, then such an "and" circuit can be replaced by a combination of "and" circuits. As a result of this change in the circuit arrangement the trigger circuit L can only be set if in the coarse as well as in the fine reading arrangement the trigger circuits $F_1$ and $F_3$ are reset, which means that both arrangements are in rest. Furthermore the trigger circuit L can only be reset when it has been established that in the coarse as well as in the fine digitalizing control arrangement the trigger circuit $F_1$ is set. The resetting of the trigger circuit M must be made to depend on the fact that the trigger circuits $F_1$ and $F_2$ in the coarse system as well as the corresponding trigger circuits in the fine system are in their reset states. Finally the output voltage supplied by the trigger circuit M in its reset state must in the coarse as well as in the fine digitalizing arrangement, be supplied to an input circuit of an "and" circuit, such as 311, by way of which a trigger circuit $F_3$ can be reset. In the circuit arrangement shown in the lower half of FIG. 1 that operates with pulses, the simultaneous reading of a coarse and a fine system is simple. The circuit arrangement must then be provided with two trigger circuits such as 124, which are both reset by a pulse received from the reference system, and one of which is set by a pulse supplied by the circuit belonging to the synchronous transformer for coarse reading and the other by a pulse supplied by the circuit arrangement belonging to the synchronous transformer for fine reading.

In the above this invention has been described for a three-phase system only. Its application is, however, by no means restricted to three-phase systems.

Figures 5, 6, 7, 8:
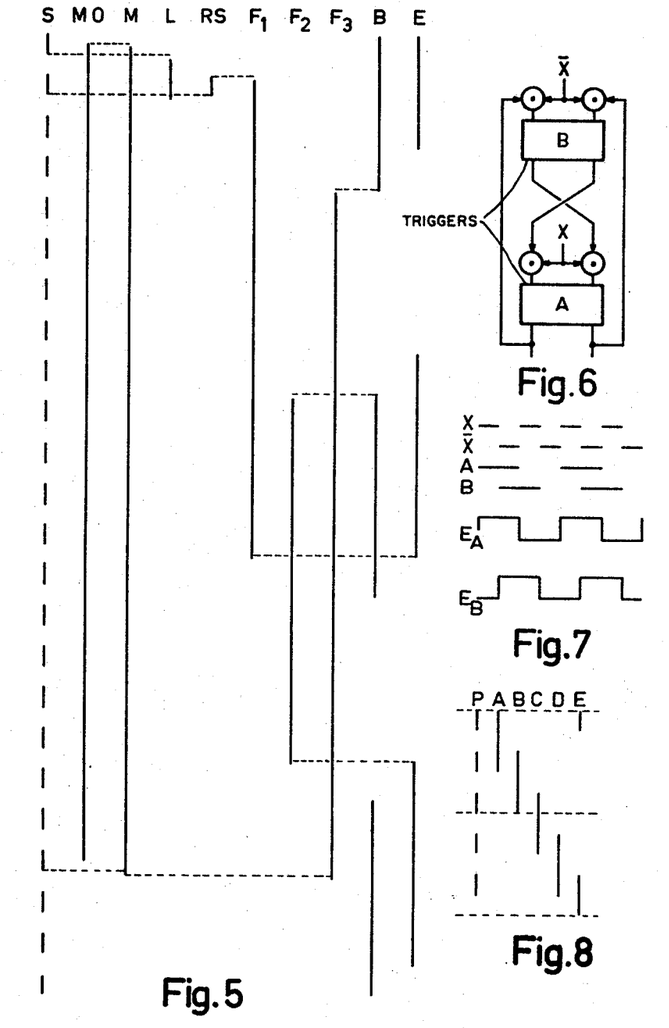
FIG. 5 is a diagram of the operation of the circuit shown in FIG. 3.
FIG. 6 is an example of a counter for supplying two-phase square-wave voltages.
FIG. 7 is a diagram of the operation of the counter shown in FIG. 6.
FIG. 8 is a diagram of a counter for generating five-phase square-wave voltages.

By means of a two-step counter it is possible to supply a two-phase square-wave voltage, as will be described with reference to the FIGURES 6 and 7. The circuit shown in FIG. 6 receives a train of square-wave voltages or pulses X and their inversions $\overline{X}$. If the trigger circuit B is in its reset condition, a square-wave or pulse X will set the trigger circuit A. The next inverted square-wave or pulse $\overline{X}$ then sets the trigger circuit B, with the result that the next square-wave or pulse X resets the trigger circuit A, after which a cycle is completed when the next inverted square-wave or pulse $\overline{X}$ resets the trigger circuit B. The diagram of FIG. 7 shows the successive states of the trigger circuits as well as the occurrence of square-wave voltages X and $\overline{X}$. By means of amplifiers, square-wave voltages represented by the curves $E_A$ and $E_B$ can be derived from the output voltages of the trigger circuits, and these square-wave voltages can be used as supply voltages for a two-phase synchronous transformer.

By means of a counter with $n$ positions it is possible to generate a $n$-phase square-wave voltage system which can be used as supply systems for a $n$-phase synchronous transformer. In principle this is elucidated with reference to FIG. 8. In this diagram the dotted line P represents the square-wave voltages controlling the counter with $n$ positions, whilst the lines A, B, C, D and E show the successive conditions of the trigger circuits A, B, C, D and E in the counter with five positions. One of the five-phase square-wave voltages is obtained by combining, by means of an "or" circuit, voltages supplied by the trigger circuits A and B, in their set conditions. This voltage obtains a value which differs from the quiescent value as long as the condition $A+B=0$ is satisfied, and it obtains the quiescent value as long as A as well as B are reset. The second square-wave phase is derived in a similar way from $B+C$, the third from $C+D$, the fourth from $D+E$, and the fifth from $E+A$.

In practice only the two- and the three-phase systems are probably important because for these systems only can good quality and accurate synchronous transformers be obtained as standard products.

The circuit arrangements are shown in simplified form so that, for instance amplifiers, emitter followers, cathode followers and such components are not shown, although such components may be necessary if certain parts of the circuits are too heavily loaded or are loaded by the wrong impedance.

As a rule a synchronous transformer is built in a way similar to that of a synchronous motor. It comprises a polyphase stator in which a single phase rotor can rotate. The positions of polyphase and single phase windings may be interchanged, the former being carried by the rotor and the latter by the stator. Moreover, synchronous transformers have been built in which the parts carrying both windings are capable of rotation in order to establish the position of the one part with respect to the other. Other synchronous transformers have been arranged for establishing relative linear motion, in which the parts carrying the windings can be shifted with respect to each other. Synchronous transformers in which at least one part is rotatable are sometimes called rotary transformers and in many cases they are indicated by trade marks, such as Selsyn and Magslip.

A ring counter is a very effective electronic counter for providing the polyphase signal but other types of counters such as scale of two counters, can also be applied for this purpose.

What we claim is:

1. Apparatus for digitally indicating the angular displacement of a single phase winding of a synchronous transformer with respect to a polyphase winding of said transformer, comprising a source of high frequency signals, a second low frequency signal source for providing an output signal having a frequency which is a sub-multiple of said high frequency signal, means connected to said second source for converting said low frequency signals from said second signal source into a polyphase signal, said synchronous transformer windings mounted for mutual rotational displacement, means connecting said converting means to said polyphase winding for providing a magnetic field rotating in the single phase winding at a frequency which is a sub-multiple of said low frequency signal, said single phase winding thereby providing an output voltage having a phase displacement corresponding to the angular displacement between said single phase winding and said polyphase winding, means for generating a fixed phase reference signal, a digital counter, phase detection means connected to said single phase winding for providing an output signal corresponding to the phase of said output voltage from said single phase winding, trigger means connected to said phase detection means and said reference signal generating means for providing an output signal having a duration corresponding to the phase difference between said reference signal and said voltage from said single phase winding, and gating means connecting said trigger means and said high frequency source to said counter for conducting said signal from said high frequency source to said counter in response to the output signal from said trigger means, whereby said counter provides a sum corresponding to the relative angular displacement between said single phase winding and said polyphase winding of said synchronous transformer.

2. Apparatus as claimed in claim 1 wherein said means for generating a fixed phase reference signal comprises a second synchronous transformer having polyphase windings and a single phase winding fixed with respect to said polyphase winding, means connecting said converting means to the polyphase winding of said second synchronous transformer for providing a magnetic field rotating in the single phase winding of said second synchronous transformer at a frequency which is a sub-multiple of said low frequency signal, said single phase winding of said second synchronous transformer thereby providing an output voltage having a fixed phase, and phase detection means connected to said single phase winding of said second synchronous transformer for providing said fixed phase reference signal.

3. Apparatus as claimed in claim 2 wherein said source of low frequency signals comprises a frequency divider connected to said high frequency source for providing an output having a frequency which is a sub-multiple of the output frequency of said high frequency source.

4. Apparatus as claimed in claim 3 wherein said converting means comprises an N-stage cyclically operable counter, and means connected to said N-stage cylically operable counter for converting the output of said cyclically operable counter into N-square wave output signals each having a phase shift of $1/N$-cycles with respect to an adjacent output signal, said output of each single phase transformer winding thereby providing a non-sinusoidal output voltage, said apparatus further including a separate filter connected to each said single phase transformer winding for removing from said non-sinusoidal output of each said single phase winding all frequencies above the fundamental frequency of said non-sinusoidal waves, and including means for connecting each said phase detection means to said corresponding single phase winding through each said filter.

5. Apparatus as claimed in claim 4 wherein said digital counter comprises an N-stage digital counter.

6. Apparatus as claimed in claim 4 wherein each said phase detection means comprises an amplifier, and limiter means connected to said amplifier for providing a signal having sharply fluctuating levels corresponding to identifiable points in the cycle of said fundamental frequency output of said filter.

References Cited

UNITED STATES PATENTS

| | | | |
|---|---|---|---|
| 2,970,302 | 1/1961 | Gridley | 340—198 |
| 2,980,900 | 4/1961 | Rabin | 340—198 |
| 2,991,462 | 7/1961 | Hose | 340—198 |

THOMAS B. HABECKER, *Primary Examiner.*

U.S. Cl. X.R.

328—41; 324—70